United States Patent [19]
Zimmer et al.

[11] Patent Number: 5,400,944
[45] Date of Patent: Mar. 28, 1995

[54] PROCESSING STATION FOR WORKPIECES, ESPECIALLY VEHICLE BODIES, IN A TRANSFER LINE

[75] Inventors: Ernst Zimmer, Friedberg; Johann Maischberger, Dinkelscherben; Thomas Sturm, Sulzemoos/Wiedenzhausen; Heinz Meyer, Augsburg, all of Germany

[73] Assignee: Kuka Schweissanlgen + Roboter GmbH, Augsburg, Germany

[21] Appl. No.: 146,049

[22] PCT Filed: Apr. 22, 1992

[86] PCT No.: PCT/EP92/00887

§ 371 Date: Nov. 2, 1993

§ 102(e) Date: Nov. 30, 1993

[87] PCT Pub. No.: WO92/19486

PCT Pub. Date: Nov. 12, 1992

[30] Foreign Application Priority Data

May 3, 1991 [DE] Germany .................. 9105490 U

[51] Int. Cl.⁶ .................. B62D 65/00; B23K 37/04
[52] U.S. Cl. .................. 228/49.6; 228/49.1
[58] Field of Search .................. 228/49.8, 49.1, 49.6

[56] References Cited

U.S. PATENT DOCUMENTS
4,600,136  7/1986  Sciaky et al. .................. 228/49.1 X

FOREIGN PATENT DOCUMENTS
| | | |
|---|---|---|
| 0296369 | 5/1988 | European Pat. Off. . |
| 8812396 | 1/1989 | Germany . |
| 2172555 | 9/1986 | United Kingdom . |
| 2198702 | 6/1988 | United Kingdom . |

*Primary Examiner*—Kenneth J. Ramsey
*Attorney, Agent, or Firm*—McGlew and Tuttle

[57] ABSTRACT

The present invention pertains to a processing station (1) for workpieces, especially vehicle bodies (2), in a transfer line (3). Changeable clamping frames (5, 6) are kept ready in magazines (7, 8), and the magazines (7, 8) are arranged on both sides in front of and/or behind the work station (29) in relation to the direction of the transfer line (3). At least one processing device (4) is arranged at the work station (29) on the side of the transfer line (3). The magazines (7, 8) are preferably designed as rotatable and upright drum magazines and are connected in pairs by a common transport device (10). The old clamping frame (5) can thus be moved from the work station (29) into one magazine (7, 8) and a new clamping frame (6) can at the same time be brought to the work station (29) by one movement.

8 Claims, 7 Drawing Sheets

PROCESSING STATION FOR WORKPIECES, ESPECIALLY VEHICLE BODIES, IN A TRANSFER LINE

BACKGROUND OF THE INVENTION

The present invention pertains to a processing station for workpieces, especially vehicle bodies, in a transfer line, with a plurality of exchangeable clamping frames for different workpieces, which are kept ready in rotatable or rotating magazines on both sides next to the transfer line and can be moved from the magazine to the working station and back by means of transport device.

Such a processing station has been known from German Utility Patent No. DE-GM 88 12 396.0. It is used to weld vehicle bodies in a transfer line and operates with changeable clamping frames, which carry clamping and sometimes also processing tools for the vehicle body. The clamping frames are adapted to the type of vehicle and can be replaced in the case of a change of model. They are kept ready for this purpose in two rotatable magazines, which are arranged on both sides of the transfer line at the height of the work station. One disadvantage of this arrangement is that relatively much time is needed for replacing the magazine. On the other hand, little space is available for the processing devices, especially welding and assembly robots due to the lateral magazines. Basically only portal robots can be used, which are mounted displaceably above the work station and can reach the vehicle body only from above.

SUMMARY AND OBJECTS OF THE INVENTION

The task of the present invention is to show a processing station which offers more flexibility in terms of the processing devices and the change times.

This task is attained according to the present invention by providing magazines arranged in front of and/or behind the work station in relation to the direction of the transfer line and by providing at least one processing device at the work station on the side of the transfer line. The transport device moves the clamping frames in a plane parallel to the transfer line from the magazine to a feed device and back. The individual magazine is designed as a drum frame which is rotatable around a horizontal or vertical axis and receives a plurality of clamping frames, in which one clamping frame is in the plane extending in parallel to the transfer line in its resting position.

The magazines are no longer arranged at the height of the work station according to the present invention, but along the transfer line, offset thereto. Thus, space is created at the work station on both sides of the transfer line for the arrangement of lateral processing devices. The latter may be of any desired design and are preferably designed as robots with the necessary tools, especially welding and assembly tools. The space requirement for the processing station at right angles to the transfer line is small.

The magazines may be arranged in front of and/or behind the work station. The clamping frames are displaced along the transfer line for changing. In the simplest and most space-saving embodiment, a single magazine is associated with each work station. Four magazines, which are associated in pairs with the work stations, are arranged in the preferred embodiment.

Due to the offset arrangement of the magazines, the cycle times for a clamping frame change can be reduced. The cycle time is reduced particularly substantially in the case of the arrangement of four magazines, in which two each are connected by a common transport device over the work station, because the old clamping frame can be removed and the new one can be brought to the work station by one movement.

The magazines may have different designs, and they have at least two loading stations. The magazines may rotate around fixed axes in the manner of drums or run in the manner of paternoster elevators or the like. Their axes may assume different directions. To optimize the processing station in terms of freedom of the interference circle and change times, the magazines may be independently movable at right angles to the transfer line. It is also recommended for the same reason to arrange a feed device, preferably in the form of a frame, which receives the clamping frames fed in, feeds them in the correct position in relation to the vehicle bodies, and fixes them. These devices may have different designs; advantageous, practicable embodiments are described herein

SUMMARY AND OBJECTS OF THE INVENTION

The present invention is schematically represented in the drawings as an example. Specifically, FIG. 1 shows a top view of a complete processing station in a transfer line with two work stations and four magazines with vertical axes, FIG. 2 shows a half representation of an alternative with only one magazine per work station, FIG. 3 shows a variant to FIG. 1, with half representation with horizontal magazines and horizontal axes of rotation, FIG. 4 shows a side view of the feed device for a clamping frame at the work station corresponding to arrow IV in FIG. 1 in the changing position, FIG. 5 shows the feed device in accordance with claim 4 in the working position of the clamping frame at the body, FIG. 6 shows a side view of an alternative transport device for the clamping frame corresponding to arrow VI in FIG. 1, and FIG. 7 shows a more detailed top view of a magazine with vertical axis of rotation corresponding to FIG. 1.

DETAILED DESCRIPTION OF THE PREFERRED EMBODIMENTS

Figure 1:
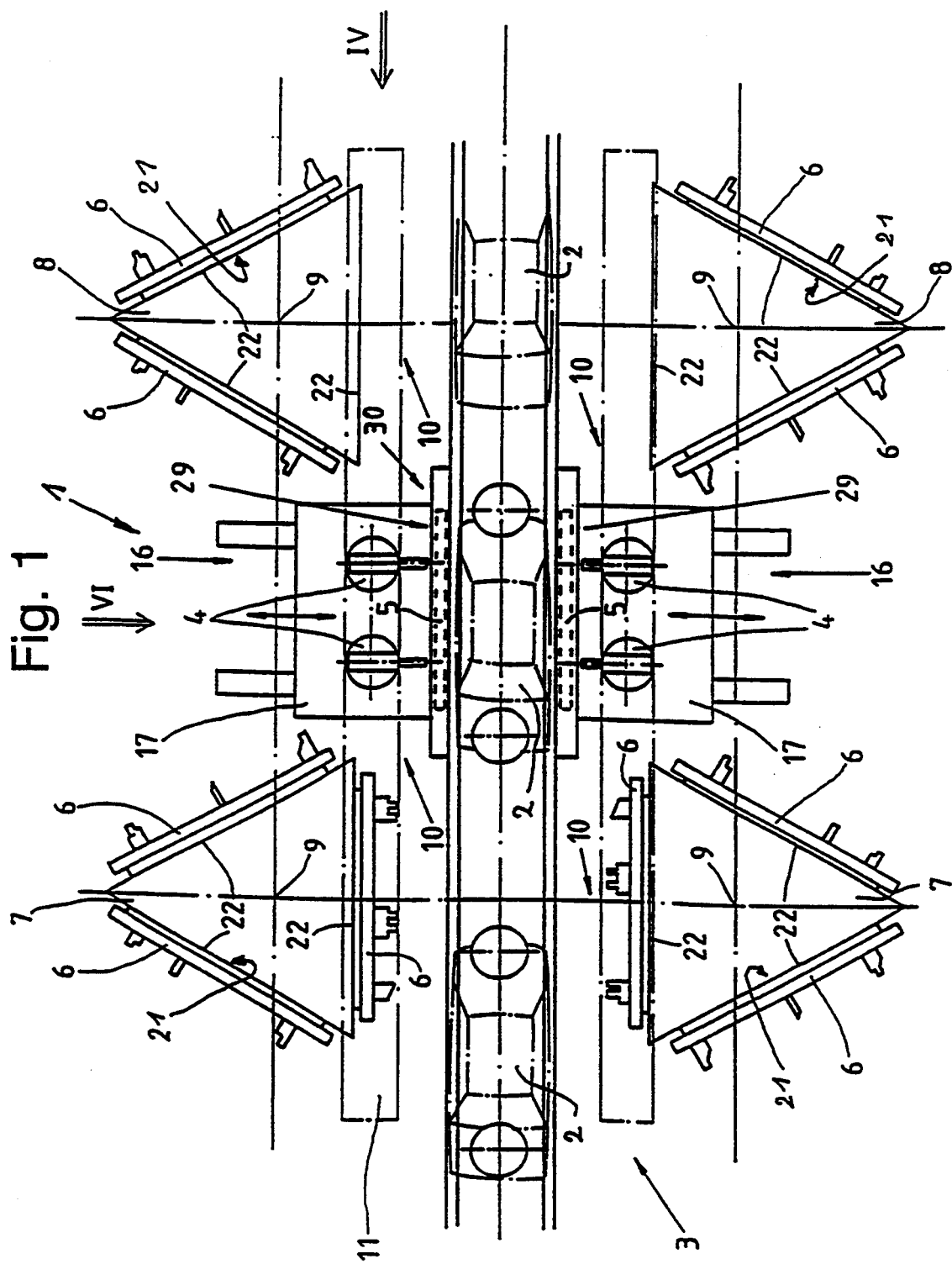
Figure 2:
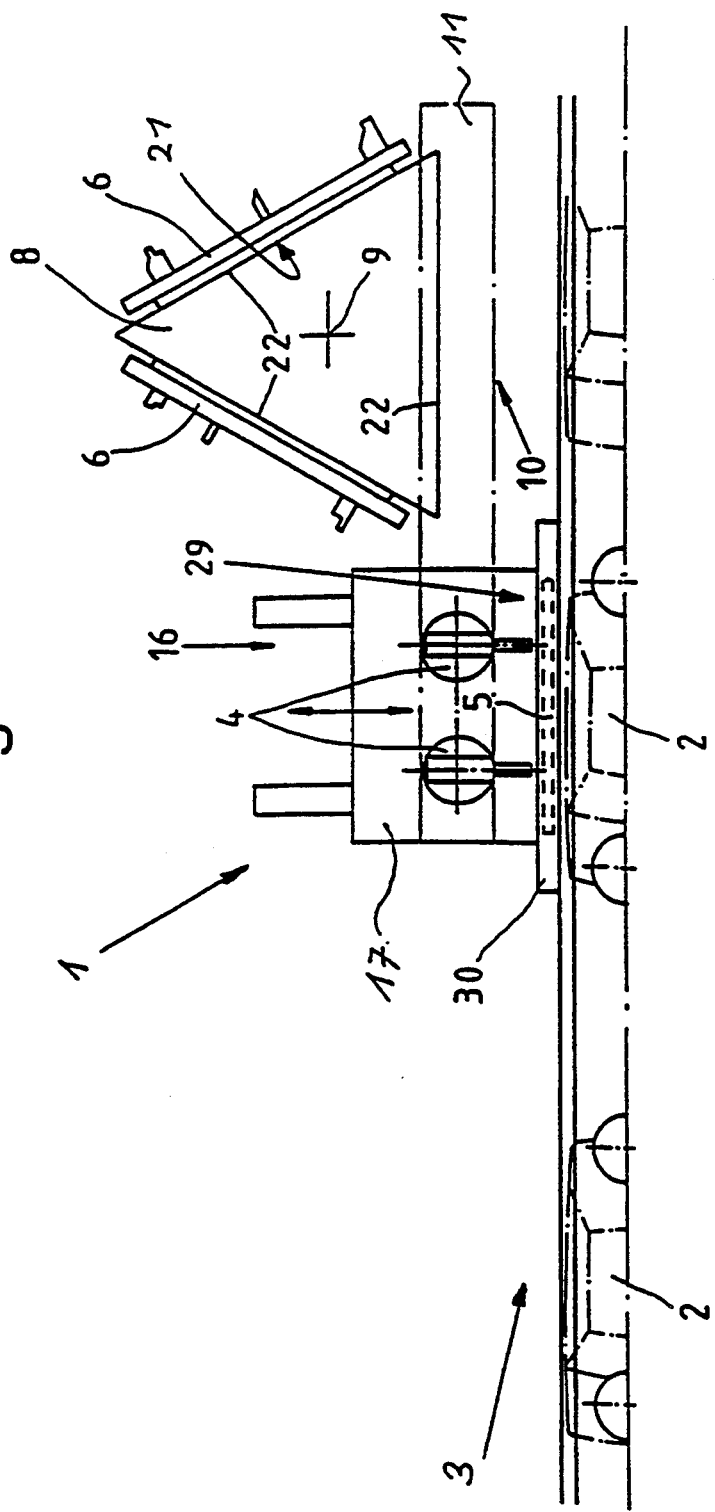
Figure 3:
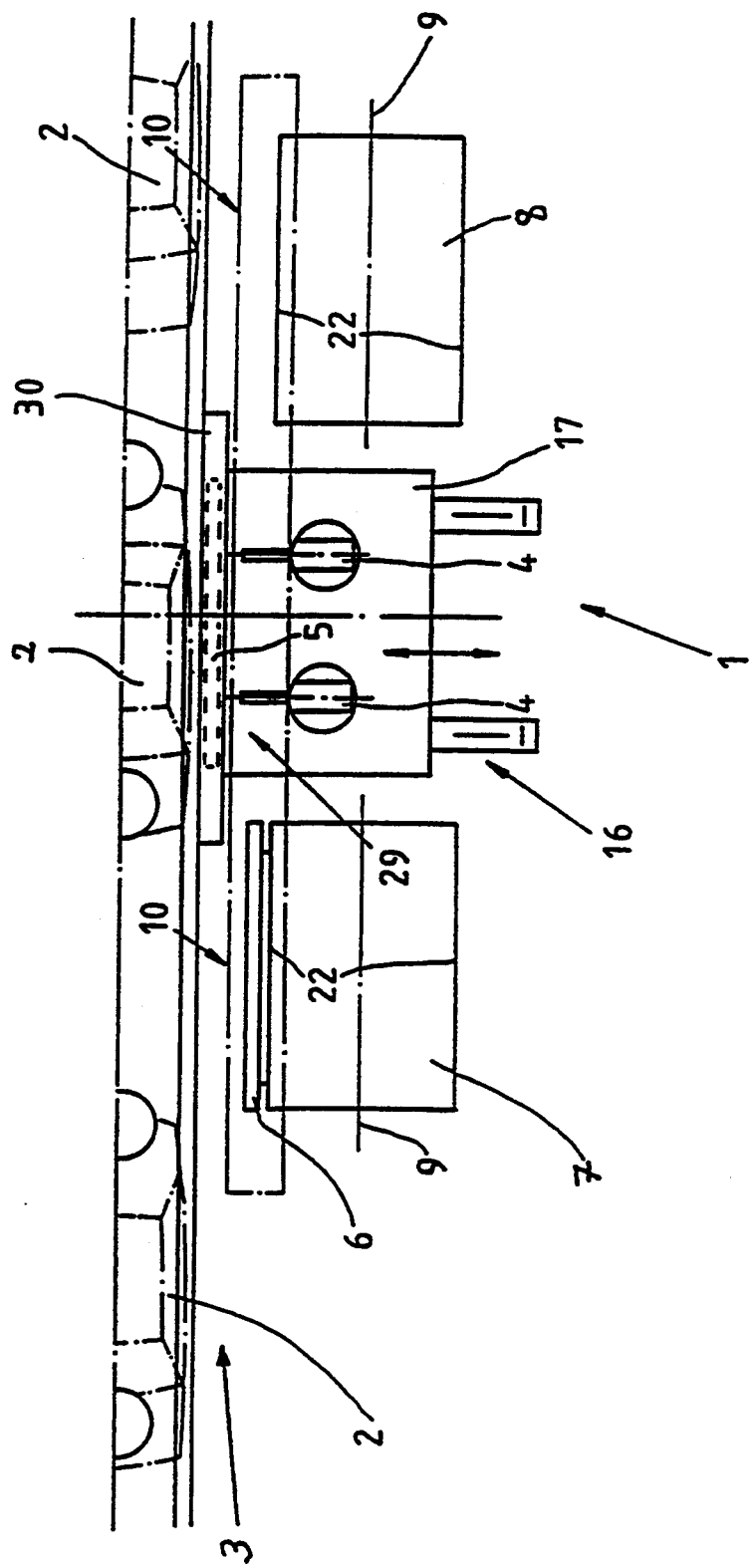

FIGS. 1–3 show a processing station (1) within a transfer line (3). It is a welding station, in which vehicle bodies (2) fed in along the said transfer line (3) are tacked and welded. Instead of vehicle bodies, other said workpieces (2) may be processed as well. The nature of the processing operations may also be freely selected as desired, e.g., it may be turning, drilling, assembling, or the like. The said processing station (1) is equipped with four processing devices (4), which are arranged in pairs on both sides next to the said transfer line (3) at the work station (29). In the exemplary embodiment shown, they are six-axis industrial robots (4), which guide welding tools, especially spot welding tongs. As an alternative, the said processing devices (4) may also be of a completely different design. In addition, portal robots or similar other processing devices may also be provided at the said work station (29).

The said vehicle bodies (2) must be clamped with their individual parts in the correct position for the welding process. Clamping frames (5, 6), which are adapted to the actual vehicle model, are kept ready in magazines (7, 8), and can be rapidly changed at the time of a change from one model of vehicle body to another, are provided for this purpose. The clamping frames that are at the said work station (29) and are in action are designated by the reference numeral (5) in the drawing, and the clamping frames located at the said magazines (7, 8) in the waiting position are designated by the reference numeral (6).

The said magazines (7, 8) are arranged offset along the said transfer line (3) in front of and/or behind the said work station (29). Four said magazines (7, 8), which are arranged in pairs on both sides next to the said transfer line (3) in front of and behind the said work station (29), are provided in the preferred embodiment according to FIG. 1. In the alternative embodiment according to FIG. 2, only one said magazine (8) is associated with each of the said two work stations (29). The said magazines (7, 8) are represented in FIGS. 1 and 2 in the form of triangular drum frames (21), which are able to pivot around vertical axes of rotation (9). The said magazines (7, 8) and the said drum frames (21) may also have a polygonal design and have a corresponding number of loading stations (22) for said clamping frames (6).

FIG. 3 shows another alternative with horizontal magazines (7, 8), which are designed as said drum frames (21) of rectangular cross section here and have horizontal axes of rotation (9). The said loading stations (22) are located at the drum jacket in this variant, and the said axes of rotation (9) extend along the said transfer line (3). As an alternative, the said horizontal axes of rotation (9) may also extend at right angles to the said transfer line (3), in which case the said loading stations (22) are arranged on the front side at the now more likely wheel-shaped magazines (7, 8).

Transport devices (10) are provided for moving the said clamping frames (5, 6) from the said work station (29) to the said magazines (7, 8). In the exemplary embodiment according to FIGS. 1 and 3 with four said magazines (7,8), the said transport devices (10) extend over the said work station (29) and both said magazines (7, 8) associated therewith. Consequently, a common transport device (10) is provided for two said magazines (7, 8) each.

The said transport devices (10) have guides (11) for the said clamping frames (5, 6), which are aligned along the said transfer line (3) and on which the said clamping frames (5, 6) are directly or indirectly guided. The said transport devices (10) have towing devices (12) for moving the said clamping frames (5, 6) along the said guides (11).

The said magazines (7, 8) are arranged close to the said transfer line (3), but are arranged somewhat offset in relation to the said clamping frame (5) located in the working position for reasons dictated by the interference circle. Thus, the said clamping frames (5, 6) are changed at a slight transverse distance from the said transfer line (3), and the said guides (11) are also located at correspondingly spaced locations from the said transfer line (3).

A feed device (16) each is provided at the said work stations (29) for feeding the changed clamping frames (5) into the working position at the said vehicle body (2). It consists of a frame (18), which holds and guides the introduced clamping frame (5). The said frame (18) is movable at right angles to the said transfer line (3) on a slide (17), which runs on rails (28). The said slide (17) is designed as a platform, on which the said robots (4) are arranged as well. The said robots (4) are moved together with the said frame (18) to and fro between the working position at the said vehicle body (2) and the change position for changing the frame.

Figure 4:
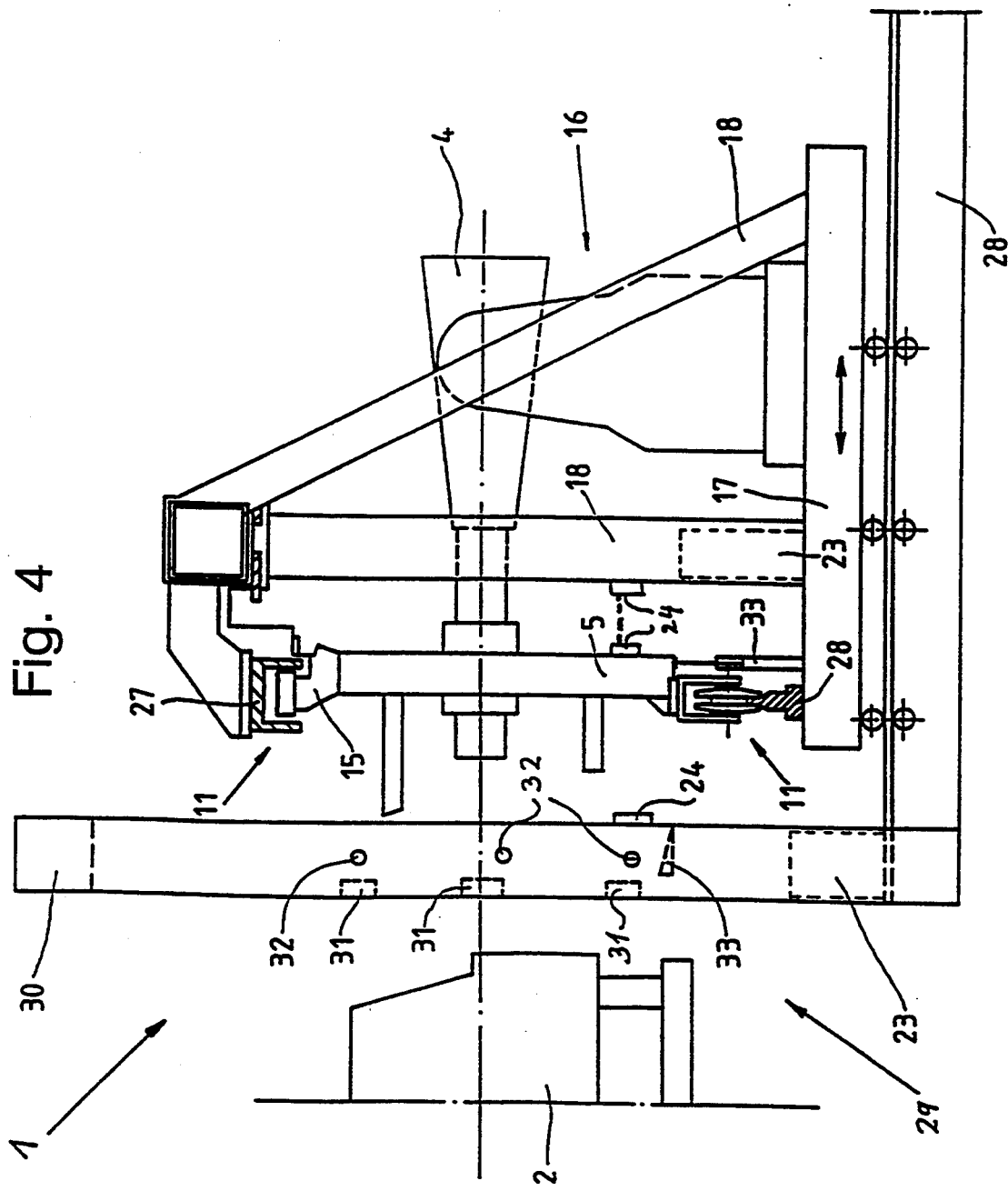
Figure 5:
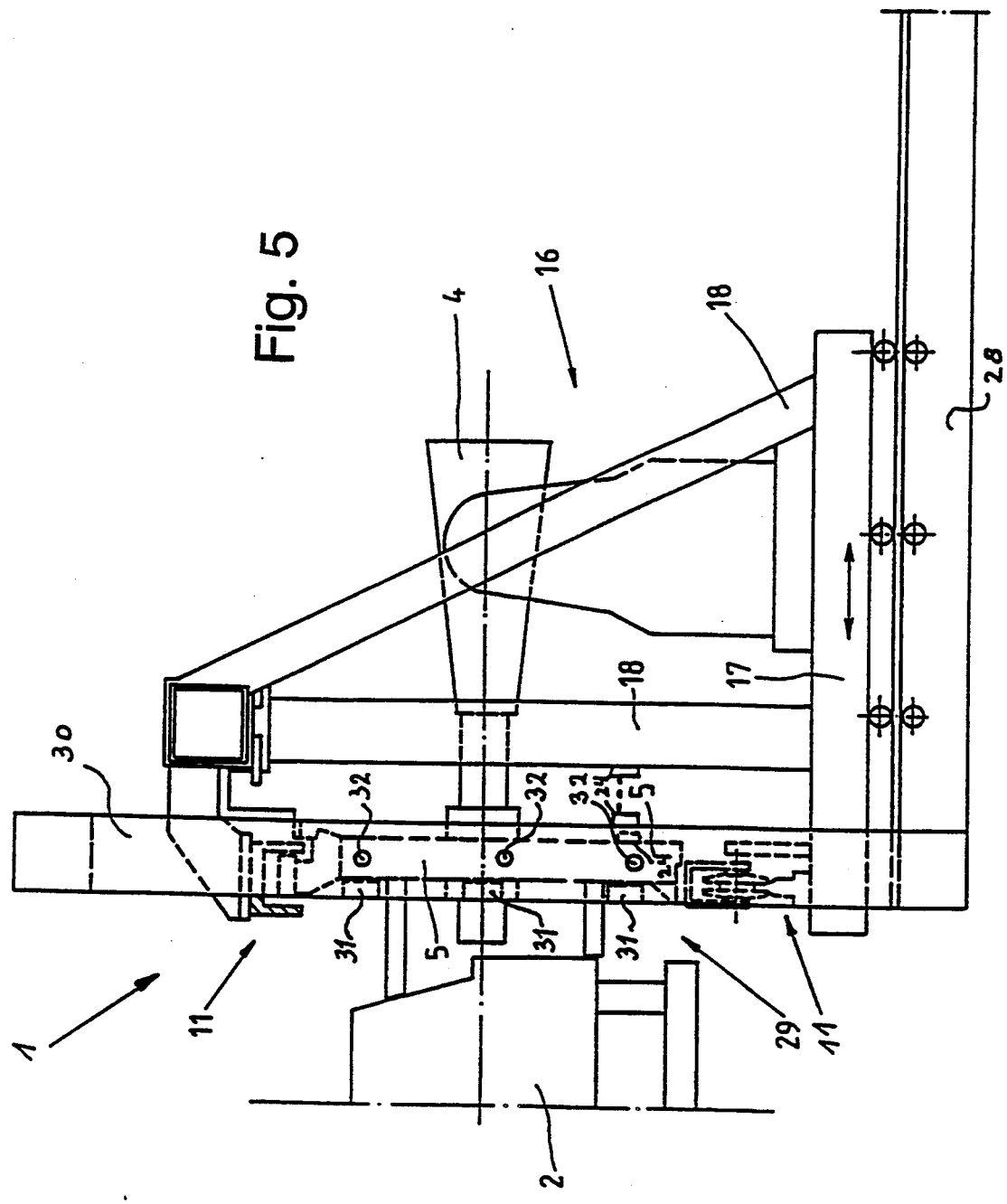

In the embodiment according to FIGS. 4 and 5, the said guides (11) are designed as upper and lower horizontal rails (27, 28), on or in which the said clamping frames (5, 6) run or are guided with corresponding traveling gears. The said guides (11) are divided into two stationary rail sections at the said magazines (7, 8) and a rail section that is connected to and is movable together with the said frame (18). FIG. 4 shows the latter section with a lower running rail (28) and an upper guide rail (27).

To replace the frame, the said frame (18) moves back far enough for the rail sections of the said guides (11) to become aligned. The said clamping frame (5) at the said frame (18), which said clamping frame is to be replaced, and the said new clamping frame (6) at the said magazine (7), which clamping frame is to be introduced, are then grasped at the same time by the said towing device (12), e.g., in the form of a rotating chain drive, and they are moved by a common lifting movement along the said transfer line (3). The said other magazine (8) is correspondingly positioned with an empty loading station (22) at the said guide (11), so that the said clamping frame (5) can directly enter the said loading station (22), while the said new clamping frame (6) reaches the said frame (18). To make possible this form of frame change, not all said magazines (7, 8) are occupied., but they leave at least one said loading station (22) empty.

Figure 6:
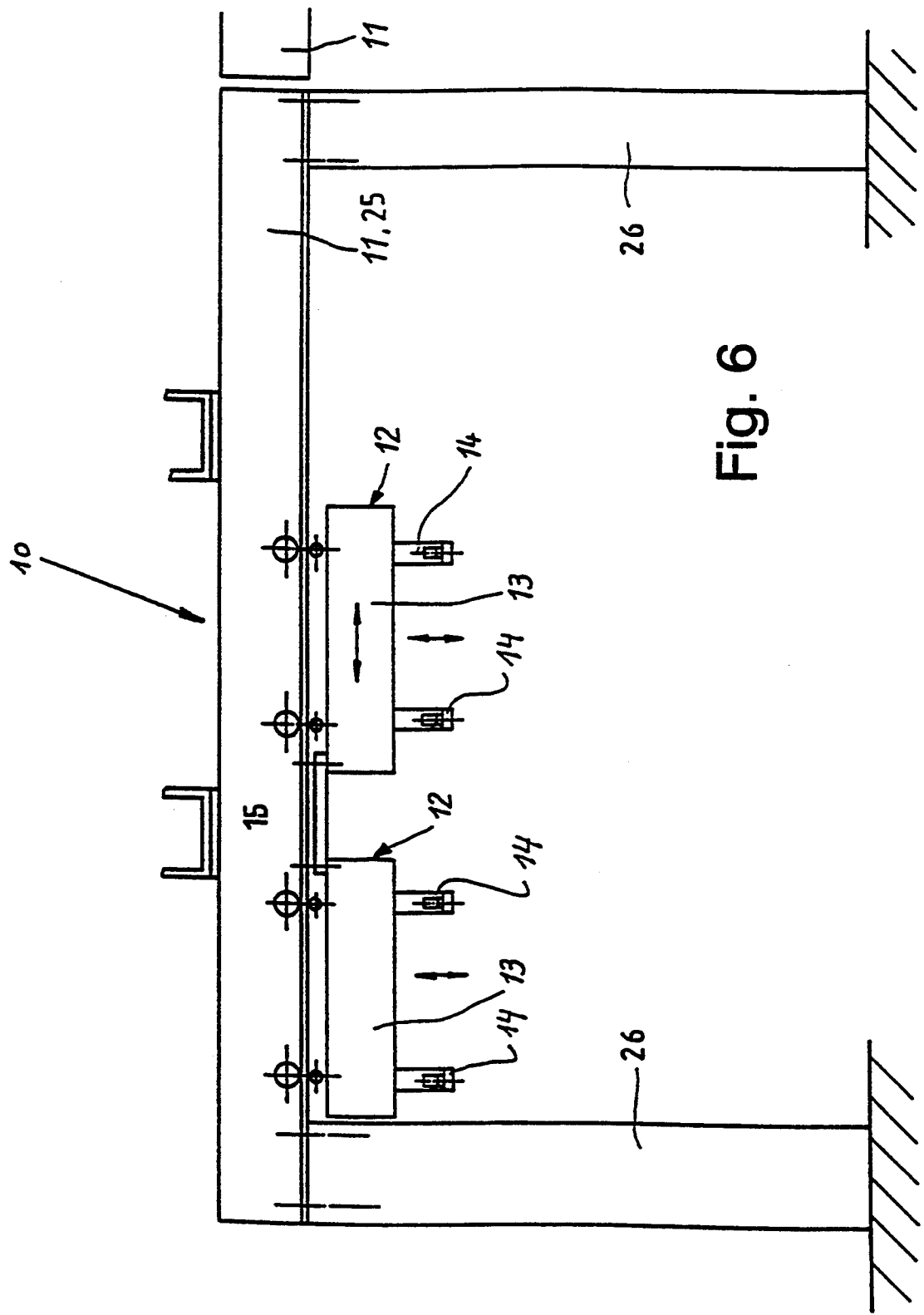

FIG. 6 shows an alternative form of a said transport device (10). The said clamping frames (5, 6) are mounted at the said guides (11) indirectly via the said towing device (12). The latter consists of two driven traveling carriages (13), which are coupled via a connecting rod (15) and are equipped with lifting grabs (14). The said guides (11) are designed as a stationary, continuous rail (25), which is mounted on supports (26), on which rail the said traveling carriages (13) can move to and fro. The said clamping frames (5, 6) have upwardly projecting flanges at the top edge, under which flanges they are grasped by the said lifting grabs (14), are detached from their holding position at the said magazines (7, 8) and from the said frame (18) and can again be hung up after displacement.

The said two traveling carriages (13) may also be designed without a lifting device and assume an exclusive towing function, e.g., for a transport device (10) according to FIGS. 4 and 5.

Figure 7:
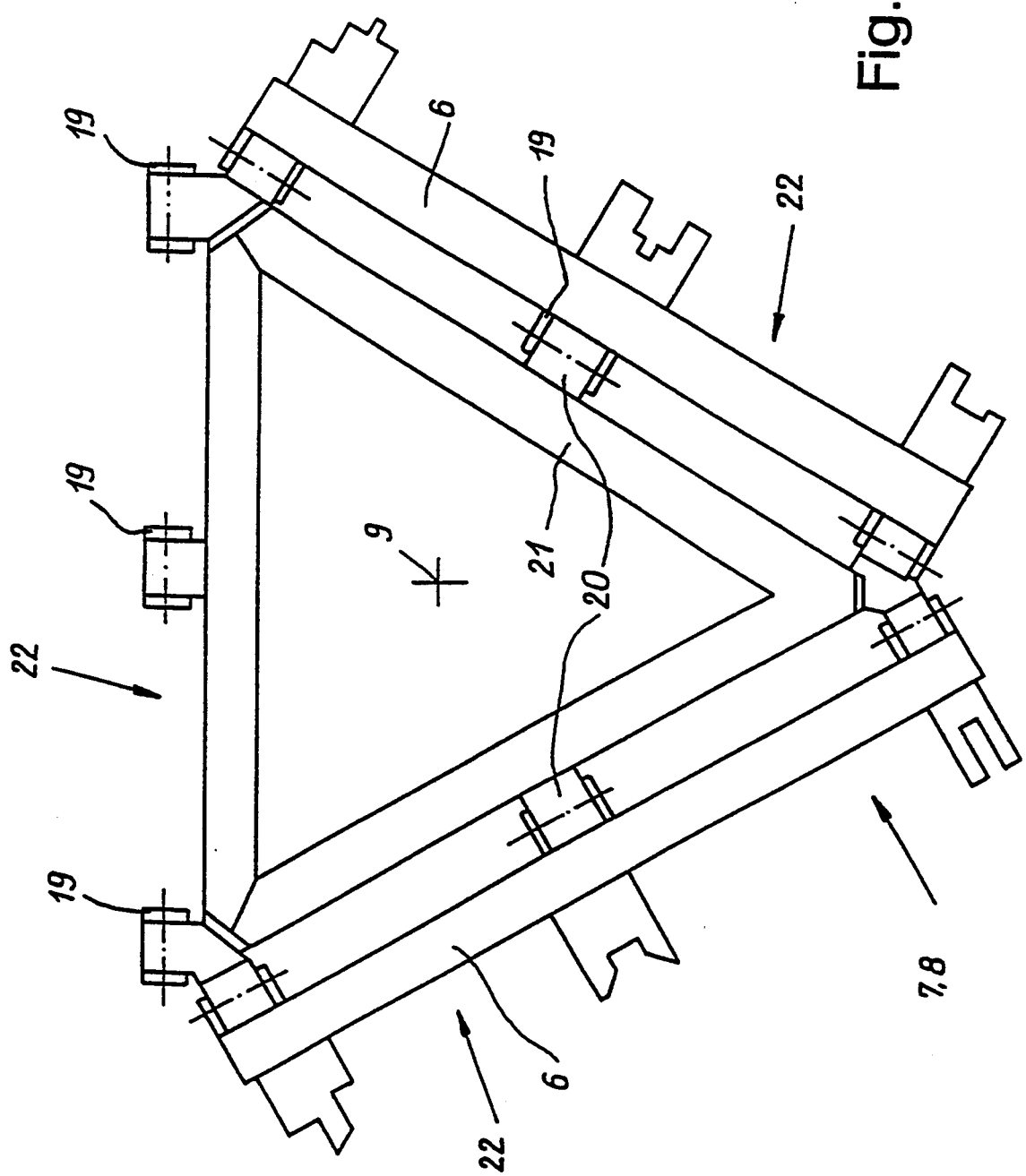

FIG. 7 shows a magazine arrangement suitable for FIG. 6. The said clamping frames (5, 6) have, on the rear side, holders (20) in the form of, e.g., transverse pins or rollers, which are grasped from below by supports (19) at the said loading stations (22) of the said magazine (7, 8). The said frame (18) has corresponding supports (19). The said clamping frames (5, 6) are hung into the said supports (19) and are lifted out by the said towing device (12) with the holders (20) by one lifting movement.

The magazine design according to FIG. 7 is also suitable for the other form of the said transport device (10) corresponding to FIGS. 4 and 5. The stationary supports are now replaced by pivotable hooks (19), which are retracted into the resting position and permit the said clamping frames (5, 6) to enter the rail sections of the said guides (11), which rail sections are rigidly attached to the magazine. The said hooks (19) subsequently pivot upward and downward and grasp the said holder (20).

Coming back to the above description of the change process, the said new clamping frame (5) picked up by the said frame (18) is fed after the frame changes in relation to the said vehicle body (2), which is accurately positioned with corresponding means. The said feed device (16) moves forward and brings the said clamping frame (5) into the working position. To accurately position the said clamping frame (5) and to fix it in the desired position, a stationary fixing portal (30) is provided, which has stops (31) on the inside, against which the said clamping frame (5) is moved by the said feed device (16). For more accurate positioning, the said clamping frame (5) may also be slightly detached from the said frame (18) or the said guides (11) by means of a suitable lifting device (33). As is shown in FIG. 4, the said lifting device (33) may consist of, e.g., a stationary ramp in the area of the said fixing portal (30). As an alternative, the said lifting device (33) may also consist of a plurality of lifting cylinders on the said slide (17). The said clamping frame (5) is fixed in the stop position and the raised position via suitable fixing elements (32) on the said fixing portal (30). These may be, e.g., extensible indexes, clamps, clamping jaws, or the like. The said clamping frame (5) is now accurately aligned with its tools in relation to the said vehicle body (2).

As is illustrated in FIGS. 4 and 5, an operating material supply unit (23) for electricity, cooling water, compressed air, hydraulic fluid, or the like may be arranged at the said fixing portal (30) and/or the said frame (18). It is provided with one or more fitting couplings (24), which engage a corresponding counterpart on the said clamping frame (5). For example, a said coupling (24) for power supply is attached to the said fixing portal (30) via a jib in FIG. 4, and it is acted upon by the feed movement of the said clamping frame (5). Another said coupling (24) for compressed air and hydraulic fluid supply is located at the said frame (18) and is connected to a counterpart on the said clamping frame.

In the embodiments with said rigid drum frames (21) shown, the said magazines (7, 8) are provided with a positioning-controlled rotating drive. Instead of a rigid drum, the said magazines (7, 8) may also be designed as relatively flexible revolving magazines with chain conveyors or the like.

We claim:
1. Processing station for workpieces comprising:
   a transfer line having a work station with processing devices;
   magazines for changeable clamping frames, said magazines being arranged adjacent to said transfer line, on both sides of said transfer line, positioned adjacent to said work station, each magazine being formed as a drum frame which is rotatable around one of a horizontal and vertical axis, said drum frame receiving a plurality of clamping frames wherein one clamping frame is in a plane extending in parallel to said transfer line in a resting position;
   a feed device; and
   a transport device for moving clamping frames back and forth between said magazine and said feed device, said feed device being displaceable at right angles with respect to said transport device, said transport device moving in a plane parallel to said transfer line.

2. Processing station according to claim 1, wherein said transport device is common to pairs of said magazines, said transport device moving each old clamping frame from said work station into a magazine and bringing a new clamping frame to said work station from another magazine by one movement.

3. Processing station according to either claim 1 or claim 2, wherein said magazines include a plurality of loading stations for clamping frames, at least one of said loading stations being not occupied.

4. Processing station according to either claim 1 or claim 2, wherein said transport device has guides extending along said transfer line and towing devices for said clamping frames.

5. Processing station according to claim 4, further comprising a frame for receiving said clamping frames and positioning means for the accurate positioning and fixation of said clamping frame, in relation to the workpiece, said frame and said positioning means being arranged at said work station.

6. Processing station according to claim 5, wherein said frame is arranged displaceably, to move at right angles to said transfer line.

7. Processing station according to claim 6, wherein said frame and one or more of said processing devices are arranged on a common slide, said common slide being displaceable at right angles to said transfer line.

8. Processing station according to claim 5, further comprising an operating material supply unit including one or more couplings for connecting said clamping frames, said operating materials supply unit being arranged in an area of said work station.

* * * * *